(12) United States Patent
Dignat

(10) Patent No.: US 6,412,804 B1
(45) Date of Patent: *Jul. 2, 2002

(54) WHEELCHAIR WITH IMPROVED SUSPENSION

(76) Inventor: M. Yves Dignat, 23 Ave. H. Bernére, 09200 Saint Girons (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/424,689

(22) PCT Filed: May 29, 1998

(86) PCT No.: PCT/FR98/01081

§ 371 (c)(1),
(2), (4) Date: Mar. 3, 2000

(87) PCT Pub. No.: WO98/53786

PCT Pub. Date: Dec. 3, 1998

(51) Int. Cl.[7] ................................................. B62K 1/00
(52) U.S. Cl. .................... 280/283; 280/250.1; 180/65.5
(58) Field of Search ............................... 180/907, 209; 280/250.1, 304.1, 283, 285, 286; 16/44

(56) References Cited

U.S. PATENT DOCUMENTS

| 2,126,084 | A | | 8/1938 | Balz ............................ 267/20 |
|---|---|---|---|---|
| 3,968,991 | A | * | 7/1976 | Maclaren ...................... 297/45 |
| 4,078,817 | A | * | 3/1978 | Fereguson et al. ............ 280/701 |
| 4,310,167 | A | * | 1/1982 | McLaurin ................... 280/5.28 |
| 4,455,031 | A | | 6/1984 | Hosaka ........................ 280/242 |
| 4,559,669 | A | * | 12/1985 | Bonzer et al. .................. 16/44 |
| 4,596,302 | A | * | 6/1986 | Suzuki et al. ................ 180/227 |
| 4,615,856 | A | | 10/1986 | Silverman .................... 264/222 |
| 4,662,467 | A | * | 5/1987 | Arai et al. ................... 180/210 |
| 5,088,747 | A | * | 2/1992 | Morrison et al. ............ 297/219 |
| 5,103,530 | A | * | 4/1992 | Andrisin, III et al. .......... 16/20 |
| 5,108,126 | A | | 4/1992 | Banse ........................ 280/668 |
| 5,180,025 | A | | 1/1993 | Yeh et al. ................... 180/65.5 |
| 5,217,239 | A | * | 6/1993 | Koet ........................ 280/250.1 |
| 5,394,589 | A | | 3/1995 | Braeger et al. ................. 16/44 |
| 5,727,802 | A | * | 3/1998 | Garven, Jr. et al. ...... 280/250.1 |
| 5,772,237 | A | * | 6/1998 | Finch et al. ................. 280/704 |
| 5,855,387 | A | * | 1/1999 | Gill et al. .................... 280/283 |
| 5,862,874 | A | * | 1/1999 | Brienza et al. .............. 180/6.5 |
| 5,996,716 | A | * | 12/1999 | Montiglio et al. ......... 180/65.5 |
| 6,070,898 | A | * | 6/2000 | Dickie et al. ............ 280/304.1 |
| 6,149,169 | A | * | 11/2000 | Chegren ..................... 280/86.1 |
| 6,203,054 | B1 | * | 3/2001 | Matsumoto ................. 280/647 |
| 6,220,382 | B1 | * | 4/2001 | Kramer, Jr. et al. ....... 180/65.5 |

FOREIGN PATENT DOCUMENTS

| DE | 19733453 A1 | * | 2/1999 |
|---|---|---|---|
| EP | 0217261 | * | 4/1987 |
| EP | 0 677 285 A1 | | 10/1995 |
| EP | 0 683 088 A1 | | 11/1995 |

* cited by examiner

Primary Examiner—Brian L. Johnson
Assistant Examiner—Daniel Yeagley
(74) Attorney, Agent, or Firm—Arent Fox Kintner Plotkin & Kahn

(57) ABSTRACT

The invention relates to a wheelchair whose suspension is flexible and designed to absorb and filter vibrations. The rear train comprises a triangle (1) attached to a chassis beam, a pivot pin (15) that carries the wheel R and a strut (6) with bearing on a central shock absorber (10). The small front wheels are mounted on a double system (21, 26) that filter the vibrations.

17 Claims, 4 Drawing Sheets

WHEELCHAIR WITH IMPROVED SUSPENSION

CROSS-REFERENCE TO RELATED APPLICATION

This application is a National Stage filing of International Application No. PCT/FR98/01081, filed May 29, 1998, which claims the priority of French Application No. 97/06843 filed May 30, 1997.

BACKGROUND OF THE INVENTION

1. Field of the Invention

The present invention relates to the technical field of wheelchairs, especially for persons who are handicapped or elderly, or suffering from a disease.

2. Description of Related Art

The present invention relates to the technical field of wheelchairs, especially for persons who are handicapped or elderly, or suffering from a disease.

It is common knowledge that aside from a certain, very limited, improvement in comfort, and new elements such as electrical motorization, wheelchairs have not changed much from a technological perspective. To date, the best of them are constituted by a cycle part and a seat part, the cycle part being rudimentary in its design. In the prior art, the two parts are still considered globally by manufacturers, which partially explains the serious defects and disadvantages that remain. At best, overall changes have been made without providing any drastic improvement in a particular area.

The chief serious defects or disadvantages that still characterize the prior art after decades are:

- vibrations on any rough or frequently uneven surface such as black top, gravel, cobblestone, the paving stones of pedestrian walkways, indoor or outdoor stone or tile, and the like, which are difficult, even painful for users;
- the difficulty of negotiating obstacles such as sidewalks, steps, and the like, when ascending or descending;
- the lack of shock absorption of any kind,
- the risk of overturning in case of banked curves;
- the seat of the chair, which is very poorly adapted, or non-adaptable, to the particular situation and hence to the comfort of the person in question; there is no real support of the individual, which in addition to mere discomfort, creates a risk of the person's slipping and falling.

At present, two main types of wheelchairs are known.

There is a standard collapsible wheelchair, which is subject to Social Security reimbursement, and with which hospitals, homes for the elderly, various centers involved with the problems of the handicapped, and certain service organizations are equipped. The assistance of a third person is required for its use, particularly for negotiating obstacles; this chair is heavy and difficult to handle, and storing it has proven to be complicated.

There is also a lightweight chair that can be considered to be a "sport" chair, collapsible or non-collapsible, better looking and easier to handle, which is aimed at a clientele of independent users who seek greater autonomy and/or have to perform exercises.

Many changes have appeared for making these chairs more adaptable between ordinary and "independent" or "sport" use, but the defects mentioned above have not been eliminated. This is especially true for the kinematic part, the suspension, the flexibility of the wheel trains, the filtering of vibrations. The prior art has been limited to providing a change in the camber of the wheels (i.e., the angle of the plane of the wheel relative to the vertical), making it possible to switch from indoor use (taking up a minimum of space, in order to pass through standard 80-cm wide doors) to outdoor or "sport" use (camber adjusted for better stability). However, handling remains complicated and no solution is provided with regard to vibrations or the negotiation of obstacles. A slightly lower risk of overturning is obtained, but only at the cost of an adjustment that is difficult for the user to perform.

To give a structural example, all of the current non-collapsible wheelchairs comprise a single rigid crossbar that supports the wheels of large diameter, and all the chairs are based on this immutable concept.

As for the current small front wheels, one skilled in the art knows that it is not unusual to see out-of-round wear on the joint, which can result in the breakage of the piece, caused by the mechanical stresses sustained by the fork, which stresses are even greater when they act on wheels of small diameter.

There is the known patent EP 0 384 499, according to which the central suspension comprises a funicular quadrilateral with an articulated parallelogram in order to reduce the risk of overturning backward during an effort. This document does not solve the same problem as the present invention, and its technical solution is unrelated. However, this document clearly illustrates the multitude of problems, discomforts and even risks that the user must face.

It seems that the profession is satisfied with this state of things, the vast majority of clients by definition not having much control over their choice, while cost considerations, which are important, have prevailed against any major innovation.

Also known through the document U.S. Pat. No. 5,180,025, which may be considered to describe the closest prior art, is an electric wheelchair in which the wheels are mounted on a rudimentary suspension system. The latter is constituted by two helical springs, each pivotably joined to the frame of the chair by one end, and to a wheel support arm by the other end, said arm itself being joined by a pivot joint to a fixed piece of the frame.

Also known through the document U.S. Pat. No. 2,126,084 is a suspension system for motorized vehicles. It is an old document (1933), specifically devoted to suspensions for automobiles, and does not apply directly to wheelchairs. The main object pursued in this document is to provide a suspension system comprising a suspension for each wheel independent of the other wheels, housed in a tubular part of the body of the vehicle, which can be removed in one piece with the rest of the axle.

The value of the invention is that it approaches the problem from another angle, i.e., globally, and presents an overall technical solution that simultaneously eliminates a number of drawbacks.

The invention also provides many heretofore unknown advantages.

SUMMARY OF THE INVENTION

According to an essential concept of the invention, a chassis with a rigid center beam is used. Another essential concept of the invention resides in a rear suspension with a high clearance. For this reason, the rear suspension (AR) comprises an upper articulated triangle, a lower strut forming a countershaft to a shock absorber, with a wheel support pin.

The central beam can have any cross section, for example square or rectangular, depending on the cost. It would be preferable, however, for the beam to have an inverted trapezoidal cross section (small base at the bottom) in order to facilitate the collapsibility of the chair as described below, and to generate a negative cambering, also as described below.

Collapsibility is facilitated by a beam with an inverted trapezoidal cross section in that, by releasing a locking means that will not be described herein, the entire structure is lowered by gravity with a deformation of its geometry, the folding of the parts being facilitated by the trapezoidal shape, with suitable indentations cut into the edge of the beam in order to allow a complete folding.

Furthermore, a beam with an inverted trapezoidal cross section makes the triangle (1) (FIG. 3 and description below) shorter than the lower strut (6a). Thus, during compression, for example during a turn, the lowering of the beam (vertical force represented by the arrow) translates (arrows) into a negative cambering of the wheel (i.e., the top part of the wheel is displaced inward); this results in better stability on the ground and hence better road-holding.

An adjustable shock absorber/telescopic spring is attached to the countershafts of the lower struts, and is mounted transversely inside the chassis beam. A helical shock absorber that allows a high clearance, or any other system allowing a high clearance, is entirely preferred.

The small front wheels (AV) are mounted on fixed or articulated struts with an original vibration filtering system, which is mounted on the support plate.

It must be noted that, in an entirely preferred way, the assembly of the parts of the suspensions AR and AV is mounted directly on the beam.

This assembly provides a level of comfort such that it becomes possible to consider, for the seating, a seat and a back made of foam or any similar material, preferably molded or otherwise adapted to the morphology of the particular subject. Without this assembly, a comfort and support system such as a molded seat would lose most of its advantage. There is therefore a synergy between the technical innovations of the rolling chassis and the rigid molded seat, the overall result being an exceptional level of comfort obtained for the first time.

The rigid molded seat is an important element of the invention because it allows a complete adaptation to the morphology of the subject, and therefore prevents any dangerous effects such as the lateral shifting or forward sliding of the subject, while avoiding the disadvantages of a poor seating position.

The word "comfort" in this case means not only the comfort of the seating, but also the comfort of the rolling, support, suspension, negotiation of obstacles, the substantial reduction in the rolling vibrations, better handling, improved safety, etc.

The novel chassis also makes it possible to mount wheels with harder and stronger treads; in fact, in the conventional chairs, the shock-absorbing function is devolved to the wheels. They are therefore equipped with treads that are as flexible as possible, but have two serious drawbacks for a handicapped person: first, a flexible tread creates greater resistance to forward motion, which requires a substantial muscular effort, and secondly, a flexible tread of this type is subject to punctures.

The invention has opted for the opposite principle, which is to provide comfort through the chassis, and thus to be able to use treads that are hard, hence having little resistance to forward motion through friction on the ground, and no risk of puncture.

The vibrations due to rough surfaces are absorbed as a result of doubly triangulated load-bearing suspensions; the potential deformation of the trains makes it easier to negotiate obstacles, smoothly and with less effort; the original suspension allows better course-holding and road-holding than that of the current models, since this suspension absorbs stresses and maintains the "cambering" of the wheels, with a correction of the angular position of the chair during banked curves. The risk of lateral overturning is therefore greatly diminished without the user's ever having to manually change the adjustment of the camber, which is both difficult and often physically impossible (requiring leaving the chair). Finally, the original design makes the chair easy to handle, while also taking up less space.

BRIEF DESCRIPTION OF THE DRAWINGS

Other characteristics and advantages of the invention will be more clearly understood through the reading of the following non-limiting description in reference to the attached Drawing, in which.

DETAILED DESCRIPTION OF THE INVENTION

Figure 1:
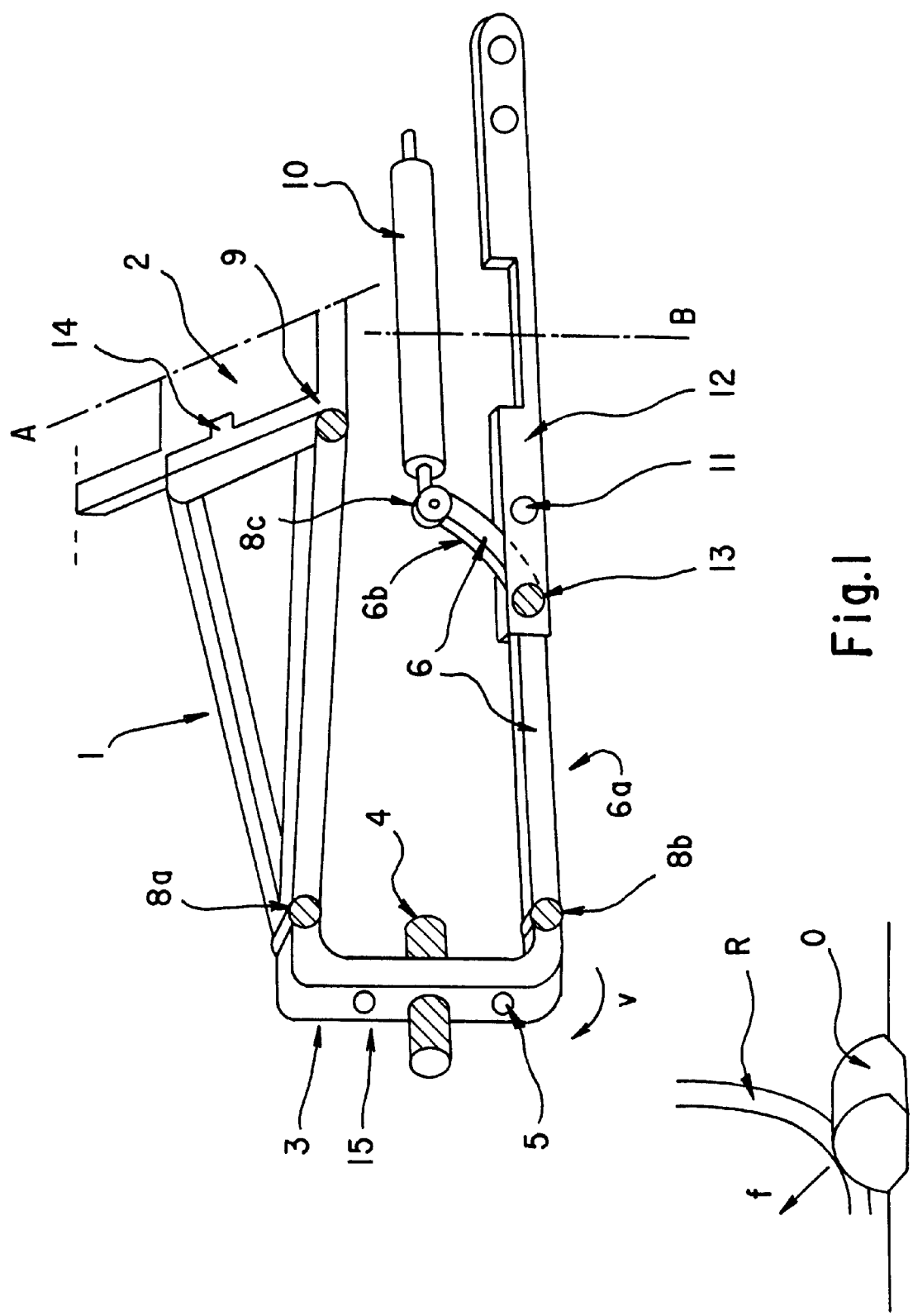
FIG. 1 represents a schematic view in perspective of the train AR.

Referring to FIG. 1, the train AR is composed of a second component comprising a triangle (1) attached near the center of the chair to the support beam (2) of the chassis, by means of any connecting plate (14) and a first attachment element (9). At its other end, the triangle is attached to the top part (3) of a pivot pin (15), also by a second attachment element (8a), which may be identical to the element (9).

A first component comprising the pivot pin 15, the bottom end of the pivot pin (15) is joined by a third attachment element (8b) (which may be identical to the element (9)) to the external end (i.e., toward the outside of the chair) of a strut (6). The strut has an approximately horizontal lower part (6a) and a rising or upper part (6b) whose geometry allows the transfer of mechanical stresses to a shock-absorber (10) of the first component and disposed horizontally and transversely, mounted in rotation around a fourth attachment element (8c) and preferably adjustable.

At approximately the level of the junction of the parts (6a) and (6b) the strut (6) is attached to a bottom plate (12) by a fifth attachment element (13) (which may be identical to, or different from, the elements (8), (9)).

In FIG. 1, two axes of symmetry A and B are represented, from which anyone skilled in the art would draw the conclusion that the same arrangement exists for the second wheel AR, the connection being produced by means of the top beam (2), the bottom plate (12) and the shock absorber (10).

The wheel R is mounted in a known way on the wheel axle support (4), generally a threaded rod or similar element. This support can have several height adjustments, as a result of locations (5) provided in the body of the pivot pin (15) for this purpose.

The bottom plate (12) can also participate in the adjustment, as a result of fittings (11) in which the fifth attachment means (13) can be housed and mounted.

It is thus possible to adjust the camber and the center of gravity, although the invention already makes it possible to wheel in complete safety without any adjustments, both indoors and outdoors, unlike in the prior art. Such an adjustment is still useful in certain situations, however, in order to further improve safety, for example in the case of exercises for quadriplegic persons.

When the wheel R encounters an obstacle O, for example a gravel surface that generates painful vibrations or a sidewalk that is difficult to negotiate, it initially sustains a reaction in the direction of the arrow f. In the existing chairs, this force translates either into a vibration, or into a cant and/or the need to resort to a substantial negotiating effort. On the other hand, according to the invention, the pivot pin (15) will first sustain a torsional or twisting movement, mostly within its own plane, in the direction of the arrow v, as a result of the combined action of shock absorbing attachment elements such as (8, 9, 13). The vibration caused by a gravel surface is thus absorbed. In the case of a larger obstacle, the torsion will be followed by an action of the strut (6) on the shock absorber (10). This will have two major consequences: first, the cant will be largely compensated by the flexibility of the train, and secondly, the negotiating effort will be much less difficult.

The pivot pin (15) is as long as possible in order to facilitate the original twisting movement as much as possible.

In its concept, the invention relates to a wheelchair characterized in that it comprises a suspension of the rear train AR that allows, through a twisting function, an absorption and filtration of vibrations.

According to one embodiment, the invention is characterized in that the suspension comprises an upper triangle (1) attached to a beam (2) of the chassis of the chair, this triangle being attached to the top part (3) of a pivot pin (15) that carries the wheel support (4). The bottom part of the pivot pint (15) is attached to the external end of a strut (6) whose other end is attached to a bottom plate (12) and forms a countershaft (6b) to a transverse shock absorber (10).

According to a preferred embodiment, the invention is characterized in that all or some of the points of attachment (9, 8, 13) are constituted by a flexible material such as a shock mount or rubber block or the like.

According to one particular embodiment, the invention is characterized in that the pivot pin (15) and/or the bottom plate (12) comprise preset locations for mounting, the wheel support (4) (locations (5)) and the strut (6) (locations (11)), respectively.

Figure 2:
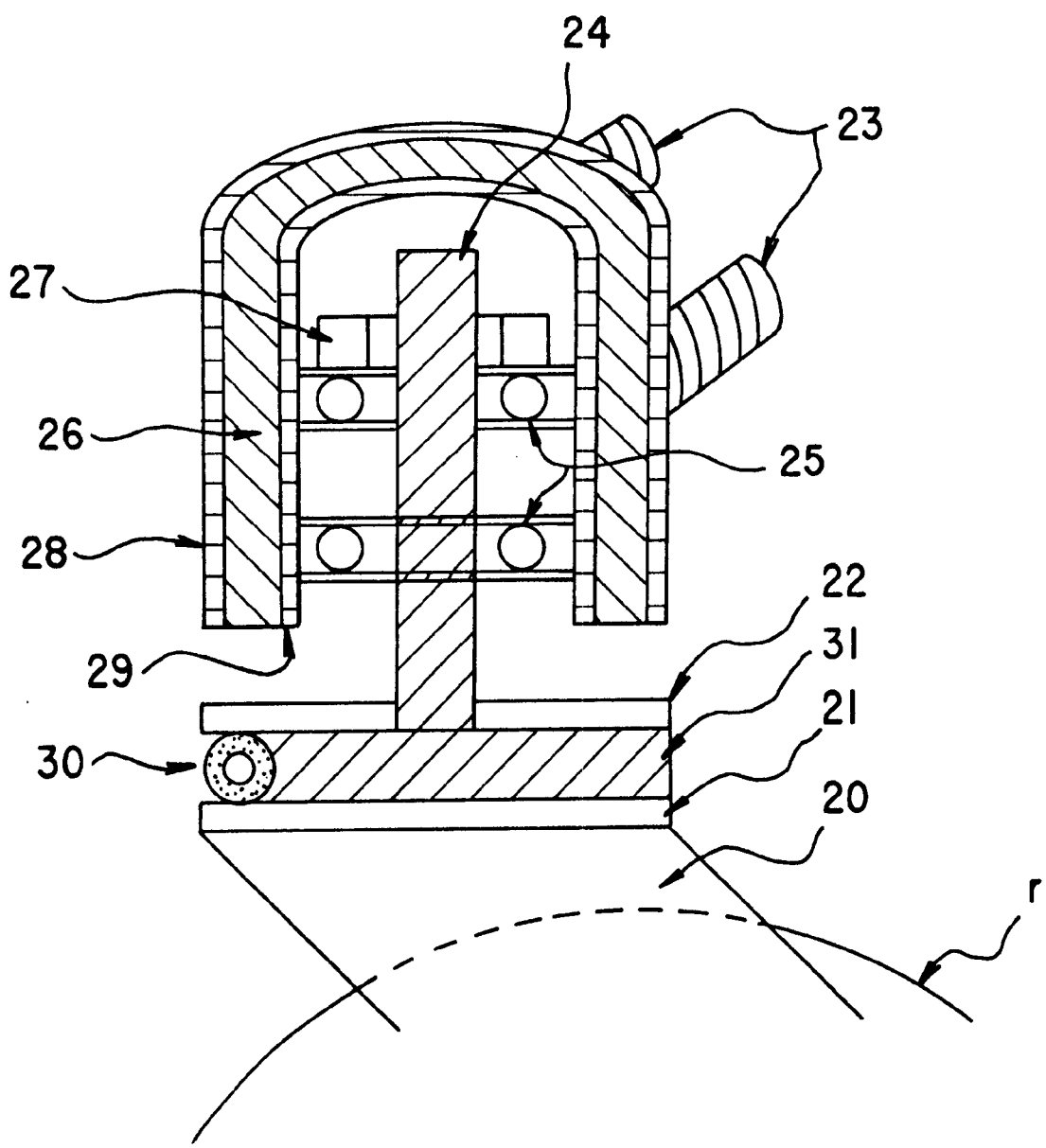
FIG. 2 represents a schematic sectional view of the train AV.
Figure 3:
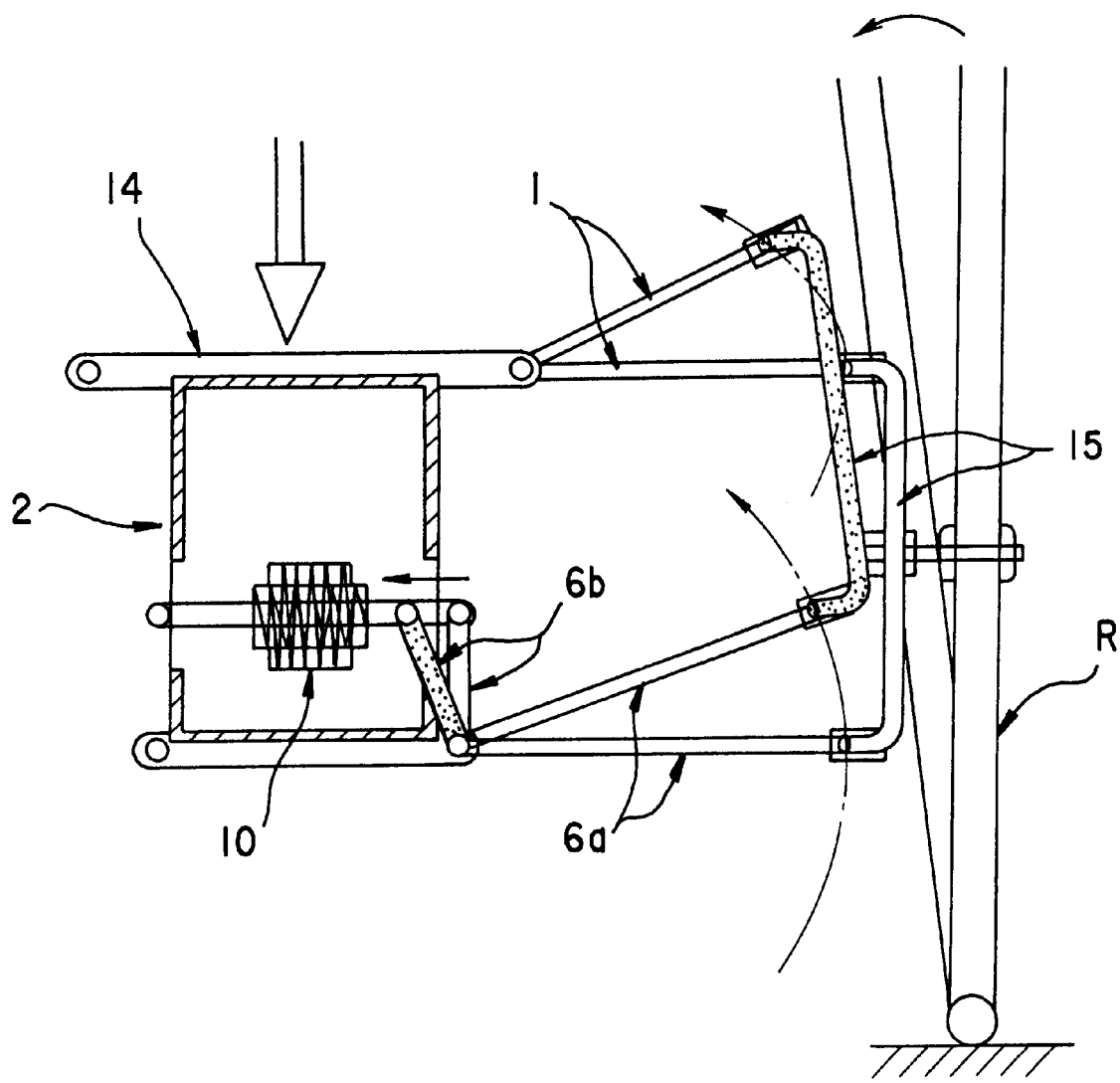
FIG. 3 represents the negative cambering in the case of an inverted trapezoidal beam.

Referring now to FIG. 2, which schematically illustrates the mounting of the small steered wheels AV, it may be seen that the assembly is attached to the chassis of the chair by conventional elements (23), in a known way. Also in a known way, the small wheel r is mounted between the branches of a fork (20). This fork is attached to the chassis, as well be seen below, by means of a pin (24) mounted on ball bearings (25) rotating inside a barrel constituted by the elements (29, 28, 26). The assembly is held in position by a nut (27).

According to the invention, the pin (24) is joined to the fork (20) by means of a complex plate (21, 22, 30, 31). The parts (21) and (22) are plates made of steel or a similar rigid material, which enclose an elastic element (31), for example of the shock mount or rubber block type according to a preferred variant. The two plates are also articulated around a rotating element (30). The elastic element (31) must be attached to the plates firmly enough (21) and (22) to allow only a slight rotational displacement of one plate relative to the other around the pivot or joint (30).

Also according to the invention, the barrel is composed of two cylindrical armatures (28) and (29), whose gap is filled by a shock-absorbing material (26), which can be similar or identical to the element (31). The assembly must be inseparable. The bearings (25) are attached to the inner armature (29), while the fastening means (23) are attached to the outer armature (28).

Finally, the pin (24) is attached to the plate (22).

The assembly therefore produces a combination of two means, the elastic means (31), which absorbs the primary shock but generates secondary vibrations that are themselves filtered through the second shock absorbing means (26).

Figure 4:
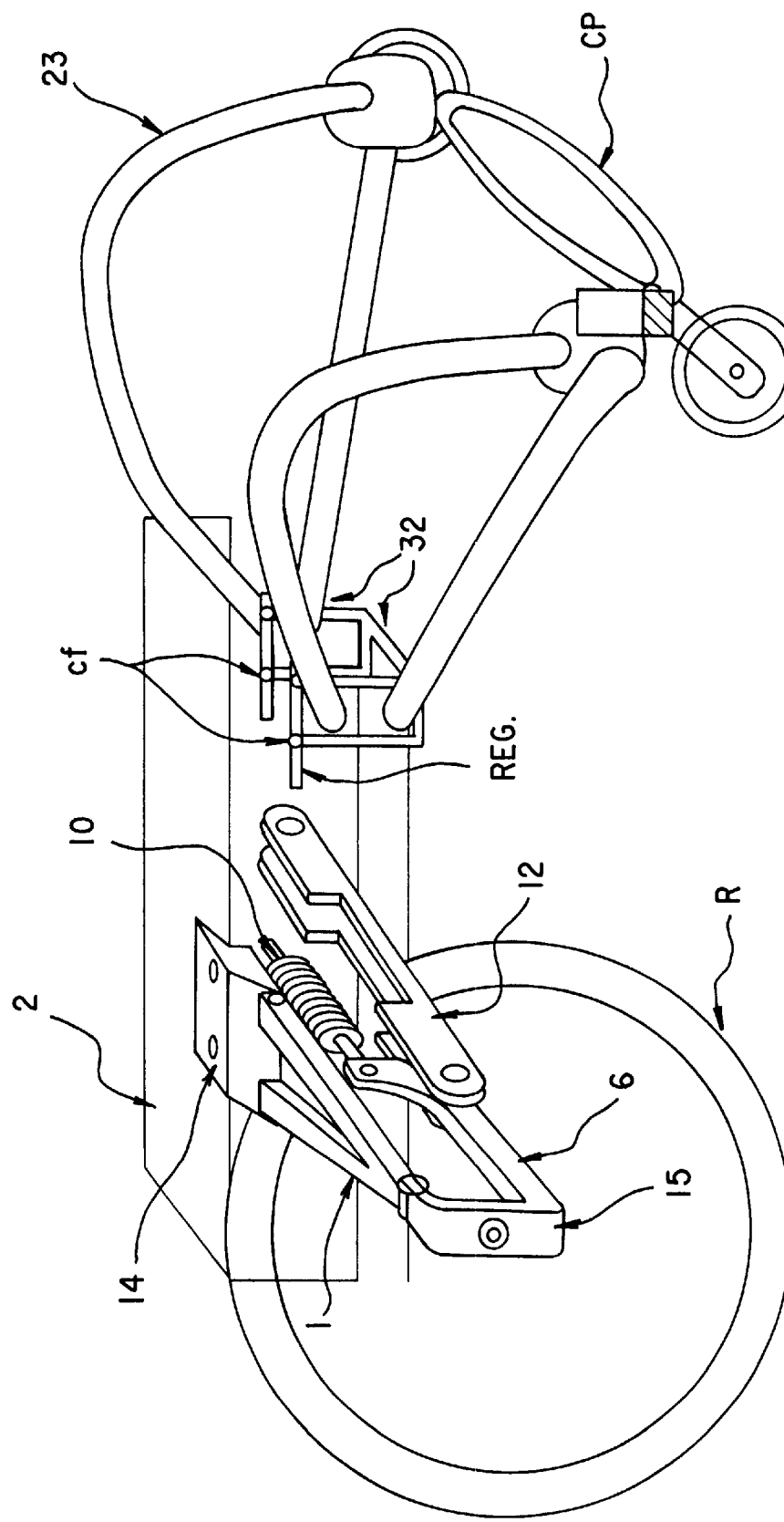
FIG. 4 represents the entire chair according to the invention, in a preferred version.

In an entirely preferred way, and as represented in FIG. 4, the small wheels AV are mounted laterally at the height of the foot rest CP, or at approximately its height, and no longer behind the foot rest as in the prior art. This prevents the so-called "spade" phenomenon, in which the foot rest can get stuck in a hollow in the ground, such as a ditch, etc. In the prior art, this accident almost inevitably results in the subject's suddenly sliding forward, with a high risk of falling. According to the invention, even if a sudden shock occurs, the suspension combined with the seat molded to the subject's morphology prevents such sliding.

As indicated above, an entirely preferred embodiment according to the invention consists of attaching the entire system, and hence also the assembly carrying the small wheels AV, directly to the center beam by an appropriate countershaft or rigid arm (23), which there is no need to describe here. Preferably, the connection (32) of this assembly to the beam will be designed to incorporate a vibration filtering element, such as one or more rubber blocks or the like. The manufacture and use of such blocks is known, for example shock mounts pressed between the two rigid pieces, etc., or any similar mounting, which will be apparent to one skilled in the art.

Generally in this description, the details of the mounting will be apparent to one skilled in the art and are therefore not described in detail.

Preferably, the assembly carrying the small wheels AV can thus be easily removable and interchangeable, for example by means of wrenches "cf." mounted in the connection (32); an adjusting means "reg.", for example an adjusting means on a bar could also be provided in this location; thus, the chair could very easily be switched from one extreme to another, for example from an extremely compact "tennis" version or "compact" version, to a "marathon" version, which is known to have only one small wheel AV. This results in great flexibility of use, as a result of the modularity afforded by the general configuration of the invention.

In both cases, the chair according to the invention is extremely well adapted to the sport in question, both in terms of comfort and support and in terms of safety.

It is possible to produce a barrel that is not cylindrical, but conical, with its narrowest part facing the bottom, in order to obtain a maximal thickness of the element (26) at the bottom part of the cone. This facilitates the shock absorbing movement according to the invention.

One skilled in the art will understand that it is possible to make the elements (26) or (31) of any known material that is reasonably elastic and strong, such as a shock mount rubber, for example. Although it would clearly be less preferable, it is also possible to consider mechanical shock absorbing elements, for example with a leaf or leaves or the like, or a combination of the two, or even a gas-filled shock absorber or the like. In practice, the only limit would be set by considerations such as cost and ease of maintenance.

This is also true for the shock absorber (10).

The rotating elements (8, 9 and 13) could also be constituted, in a preferred embodiment, of shock-mount type materials or rubber blocks or the like. They could be identical or different from one another.

According to a second general aspect, which is based on the same concept as the first, the invention relates to a wheelchair characterized in that the small front wheels AV are mounted on a fork that is itself mounted on a plate forming a vibration absorber, which carries the vertical pin that is linked to the chassis by ball bearings housed in a barrel.

According to a preferred embodiment, the invention is characterized in that this plate comprises a joint (30) and a shock absorbing element (31) inserted between two rigid plates (21, 22) and integral with these plates.

According to another preferred embodiment, the invention is characterized in that the barrel is composed of a rigid inner armature (29) supporting the bearings (25), a rigid outer armature (28) carrying the elements (23) for fastening to the chassis, and an inner filling (26) forming a shock absorber and inserted between the two armatures, and integral with them.

According to another preferred embodiment, the invention is characterized in that the shock absorbing elements (31) and (26) are constituted by a flexible material such as a shock mount or rubber block or the like.

According to another preferred embodiment, the invention is characterized in that the small front wheels (AV) are mounted on a fork that is itself mounted on a plate forming a vibration absorber, which carries the vertical pin that is linked to the chassis by ball bearings housed in a barrel.

According to a preferred variant of embodiment, this plate comprises a joint (30) and a shock absorbing element (31) inserted between two rigid plates (21, 22) and integral with these plates.

According to another preferred embodiment, the invention is characterized in that the barrel is composed of a rigid inner armature (29) supporting the bearings (25), a rigid outer armature (28) carrying the elements (23) for fastening to the chassis, and an inner filling (26) forming a shock absorber and inserted between the two armatures, and integral with them.

In an entirely preferred embodiment, the shock absorbing elements (31) and (26) are constituted by a flexible material such as a shock mount or rubber block or the like.

One skilled in the art will also understand that all of the mechanisms of the invention can be motorized, especially the various controls. Here again, the limit is set by cost and weight considerations. It is also possible to provide a simple mechanical control, for example for adjusting the camber.

The invention therefore offers a set of means that act independently and also cooperate to ensure good wheel train flexibility, and especially good front and rear pendular flexibility, and very good filtering of vibrations. The deformation of the train is not transmitted to the rest of the structure, which further improves the comfort level. The result is a chair that is extremely comfortable and fully adaptable to indoor or outdoor use. Finally, the solutions offered have the advantage of using a simple technology that is compatible with the technical field in question.

What is claimed is:

1. A wheelchair comprising:
    a chassis and a beam;
    a suspension means of a rear train; and
    a wheel supporting axle;
    said suspension means comprising a compressible first component having an equilibrium position within a first plane, substantially parallel to a substantially horizontal second plane containing the axle, said first component being moveable about said first plane and around said equilibrium position, and a second component at equilibrium within a third plane, substantially parallel to the first component, and pivoting at an angle from the third plane, wherein the combined action of the first component and the second component produce a twisting of the suspension means in response to at least one of vibrations or shocks.

2. The wheelchair according to claim 1, wherein the suspension comprises a beam, an upper triangular member, a pivot pin which carries a wheel support and has a top part and a lower part, and a strut with first and second external ends,
    wherein said triangular member is attached at a first attachment point to said beam and is attached at a second attachment point to the top part of said pivot pin, the lower part of said pivot pin is attached to the first external end of said strut at a third attachment point,
    the second external end of said strut is attached to a transverse shock absorber on one end of an upper part of said strut at a fourth attachment point and forms a countershaft to the transverse shock absorber,
    and said strut is attached at a fifth attachment point to a bottom plate at a junction between a lower part of said strut and said bottom plate and an opposite end of said upper part of said strut and
    said first component comprises said pivot pin.

3. The wheelchair according to claim 2, wherein at least one of the attachment points comprises a flexible material selected from a shock mount and rubber block, and form said second component.

4. The wheelchair according to claim 2, wherein the beam has an inverted trapezoidal cross section.

5. The wheelchair according to claim 2, wherein the transverse shock absorber is common to suspensions for a first and a second rear wheel.

6. The wheelchair according to claim 2, wherein the pivot pin and the bottom plate comprise preset locations for the wheel support and the strut, respectively.

7. The wheelchair according to claim 2, wherein the triangular member is in a horizontal plane.

8. The wheelchair according to claim 2, wherein the pivot pin is vertical.

9. The wheelchair according to claim 1, further comprising front wheels mounted on a fork member, wherein said fork member is mounted on a plate forming a vibration absorber comprising a vertical pin linked to the chassis by a barrel comprising ball bearings.

10. The wheelchair according to claim 9, wherein said plate comprises a joint and a first shock absorbing element inserted between and integral with two rigid plates.

11. The wheelchair according to claim 10, wherein the barrel is composed of a rigid inner armature supporting the bearings, a rigid outer armature comprising elements for attaching to the chassis, and an inner filling inserted between and integral with the inner and outer armatures, wherein said inner filling is a second shock absorbing element.

12. The wheelchair according to claim 11, wherein at least one of the first and second shock absorbing elements comprise a flexible material selected from a shock mount and a rubber block.

13. The wheelchair according to claim 9, further comprising a footrest positioned at a height, wherein the front wheels are mounted at approximately the height of said foot rest.

14. The wheelchair according to claim 9, wherein the front wheels are connected to the beam of the chassis by arms by means of a connection that comprises shock absorbing elements made of rubber.

15. The wheelchair according to claim 14, wherein the front wheels are housed in an assembly, said assembly comprising an adjustment means and being removable connected to said wheelchair.

16. The wheelchair according to claim 1, wherein the beam is collapsible.

17. The wheelchair according to claim 1, wherein the first component is connected to a center of the wheelchair and the second component is pivotally connected to the beam.

* * * * *